(12) United States Patent
Robinson et al.

(10) Patent No.: US 9,729,759 B1
(45) Date of Patent: Aug. 8, 2017

(54) OPTIMAL COLOR RENDITION USING SPOT COLORS DURING PRINTING

(71) Applicant: Xerox Corporation, Norwalk, CT (US)

(72) Inventors: David C. Robinson, Penfield, NY (US); Raju Seetharam, Pittsford, NY (US); Steven E. Haehn, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/249,578

(22) Filed: Aug. 29, 2016

(51) Int. Cl.
  *G06K 15/02* (2006.01)
  *H04N 1/60* (2006.01)
  *G06F 3/12* (2006.01)

(52) U.S. Cl.
  CPC ......... *H04N 1/6008* (2013.01); *G06F 3/1204* (2013.01); *G06F 3/1241* (2013.01); *G06F 3/1248* (2013.01); *G06F 3/1256* (2013.01); *G06F 3/1268* (2013.01); *G06K 15/1836* (2013.01); *H04N 1/6072* (2013.01); *H04N 2201/0094* (2013.01)

(58) Field of Classification Search
  USPC ............... 358/1.2, 1.9–3.29, 1.15–1.18, 504, 358/515–536
  See application file for complete search history.

(56) References Cited

U.S. PATENT DOCUMENTS

| 5,323,249 A | 6/1994 | Liang |
| 5,748,342 A | 5/1998 | Usami |
| 5,850,584 A * | 12/1998 | Robinson ............... G03G 15/01 358/504 |
| 5,870,530 A | 2/1999 | Balasubramanian |
| 6,038,373 A | 3/2000 | Matsumoto et al. |
| 6,108,009 A | 8/2000 | Nishikawa |
| 6,698,860 B2 | 3/2004 | Berns et al. |
| 7,515,300 B2 | 4/2009 | Takahashi et al. |
| 7,791,776 B2 | 9/2010 | Nielsen et al. |
| 8,077,348 B2 | 12/2011 | Sato et al. |
| 8,259,346 B2 | 9/2012 | Walton et al. |
| 8,310,717 B2 * | 11/2012 | Ochs ........................ H04N 1/54 358/1.9 |
| 8,498,017 B2 | 7/2013 | Robinson |
| 8,564,828 B2 | 10/2013 | Farrell et al. |
| 8,736,930 B2 | 5/2014 | Robinson et al. |
| 8,923,710 B2 | 12/2014 | Robinson et al. |
| 9,070,076 B1 | 6/2015 | Smith et al. |
| 9,077,939 B1 | 7/2015 | Ayash et al. |
| 9,204,013 B2 | 12/2015 | Robinson et al. |
| 2005/0243343 A1 | 11/2005 | Ng |

(Continued)

*Primary Examiner* — Marcellus Augustin
(74) *Attorney, Agent, or Firm* — Gibb & Riley, LLC

(57) ABSTRACT

A print job is analyzed to determine what page locations can use optional colors and different image quality increase values of different optional colors at the page locations are calculated. Only one of the optional colors is selected, based on which optional color produces the highest print job image quality increase for all of the page locations of the print job. Each individual page of the print job is evaluated to determine if use of the selected optional color increases image quality of the individual page to identify page exceptions. Instructions to mount a selected replaceable printing module corresponding to the selected optional color are displayed, and the print job is printed using the selected replaceable printing module.

20 Claims, 6 Drawing Sheets

| PAGE | SPOT COLOR | CMYK ALONE ERROR (ΔE) | CMYK +O ERROR (ΔE) | CMYK +G ERROR (ΔE) | CMYK +B ERROR (ΔE) | BEST IQ FOR SPOT COLOR | BEST IQ FOR PAGE | BEST IQ FOR JOB | PAGE EXP? |
|---|---|---|---|---|---|---|---|---|---|
| 1 | A | 7 | 7 | 3 | 6 | CMYK +G | | | |
| 1 | B | 6 | 2 | 6 | 6 | CMYK +O | | | |
| 1 | C | 7 | 7 | 3 | 7 | CMYK +G | CMYK +G | | NO |
| 2 | A | 8 | 8 | 8 | 5 | CMYK | | | YES |
| 3 | NONE | | | | | | | | YES |
| 4 | D | 4 | 4 | 1 | 4 | CMYK +G | | | |
| 4 | B | 3 | 3 | 3 | 2 | CMYK +B | CMYK +G | | NO |
| 5 | A | 5 | 2 | 5 | 4 | CMYK +O | | | |
| 5 | E | 7 | 4 | 3 | 7 | CMYK +G | CMYK +O | | |
| 5 | F | 7 | 7 | 7 | 7 | CMYK | | CMYK +G | NO |

(56) References Cited

U.S. PATENT DOCUMENTS

| | | |
|---|---|---|
| 2007/0171441 A1 | 7/2007 | Granger |
| 2008/0291479 A1* | 11/2008 | Mestha .................. G03G 13/01 358/1.9 |
| 2012/0057176 A1* | 3/2012 | Robinson ................. H04N 1/60 358/1.9 |
| 2012/0090488 A1* | 4/2012 | Postle ...................... H04N 1/54 101/483 |
| 2013/0265598 A1 | 10/2013 | Donaldson et al. |
| 2014/0009769 A1 | 1/2014 | Robinson et al. |

\* cited by examiner

| PAGE | SPOT COLOR | CMYK ALONE ERROR (ΔE) | CMYK +O ERROR (ΔE) | CMYK +G ERROR (ΔE) | CMYK +B ERROR (ΔE) | BEST IQ FOR SPOT COLOR | BEST IQ FOR PAGE | BEST IQ FOR JOB | PAGE EXP? |
|---|---|---|---|---|---|---|---|---|---|
| 1 | A | 7 | 7 | 3 | 6 | CMYK +G | | | |
| 1 | B | 6 | 2 | 6 | 6 | CMYK +O | | | |
| 1 | C | 7 | 7 | 3 | 7 | CMYK +G | CMYK +G | | NO |
| 2 | A | 8 | 8 | 8 | 8 | CMYK | | | YES |
| 3 | NONE | | | | | | | | YES |
| 4 | D | 4 | 4 | 1 | 4 | CMYK +G | CMYK +G | | NO |
| 4 | B | 3 | 3 | 3 | 2 | CMYK +B | | | |
| 5 | A | 5 | 2 | 5 | 4 | CMYK +O | CMYK +O | | |
| 5 | E | 7 | 4 | 3 | 7 | CMYK +G | | | NO |
| 5 | F | 7 | 7 | 7 | 7 | CMYK | | CMYK +G | NO |

FIG. 5

OPTIMAL COLOR RENDITION USING SPOT COLORS DURING PRINTING

BACKGROUND

Systems and methods herein generally relate to printers that use replaceable printing modules and more particularly to optimal color rendition using spot colors during printing.

In order to print using colors other than the printer's permanent colors that are used for all print jobs, or the vast majority of print jobs (e.g., colors other than red, green, blue (RGB) in a RGB printer; other than cyan, yellow, magenta, black (CMYK); etc.), in a CMYK printer, such as orange, green, blue, etc., some printers include an additional housing (sometimes referred to as the 5th color housing, or Xth housing if more than 5 are enabled) that holds replaceable printing modules (sometimes referred to as a customer replaceable unit (CCU), 5th color module, spot color module, or imaging media cartridges) that are separate from the permanent color printing modules. This allows switching of the replaceable printing modules seamlessly in minutes; however, the fifth colorants (spot colors) are more expensive than the printer's permanent colors.

When job programming an extended gamut job, two destination profiles are applied to the job. One is for printing to the extended gamut (e.g., CMYK+Orange), and the other is for printing to the base gamut (CMYK). Also, many printers have a pre-flight capability which can identify spot calls within a printer description language (PDL) file targeted for raster image processing (RIPing). On these extended gamut print engines, the capability to auto-program a job to enable optimal image quality (IQ) on spot colors based in the PDL is highly useful.

SUMMARY

Various methods herein receive a print job into a printer having permanent color printing modules and replaceable printing modules. The permanent color printing modules are permanently mounted within the printer and contain main colors, and each of the permanent color printing modules contains a single main color. The replaceable printing modules are temporarily mounted within the printer and contain optional colors, and each the replaceable printing modules contains a single optional color. The optional colors are more expensive and are used less frequently than the main colors during printing operations.

These methods automatically analyze the print job, using a processor of the printer, to determine what page locations can use the optional colors during printing. The page locations that can use the optional colors during printing comprise physical locations on media sheets where the optional colors would be printed during the printing. These methods also automatically calculate, using the processor, different image quality increase values that would be produced by printing with different optional colors at the page locations. This process of calculating the different image quality increase values determines the image quality increase values by combining the effects of the optional color with all of the main colors.

For example, these image quality increase values can be calculated by: determining a "combined color" error value (of how much printing with a combination of an optional color and the main colors would deviate from a color standard); determining a "main color" error value (of how much printing with the main colors alone would deviate from the color standard); subtracting the combined color error value from the main color error value, to produce an error reduction for each of the optional colors; and determining different image quality increase values (for each of the optional colors) based on the (positive) quantity of error reduction of each of the optional colors.

These methods automatically select, using the processor, only one of the optional colors (e.g., the "selected" optional color) to use in combination with all of the main colors for printing all of the print job, based on which of the optional colors produces the highest print job image quality increase for all of the page locations of the print job. The highest print job image quality increase can be calculated in a number of different ways. For example, this process can determine which optional color produces the highest image quality increase, relative to image quality increases of other ones of the optional colors: on the most number of pages of the print job; on the most number of page locations of the print job; or on the greatest amount of printing area of the pages of the print job. Also, these methods can receive user preferences for one or more of the optional colors. In such a case, the process of calculating the highest print job image quality increase weights the optional colors preferred by the user higher than the optional colors not preferred by the user.

After choosing the selected optional color, and before performing any printing, such methods automatically evaluate each individual page of the print job, using the processor, to determine if use of the selected optional color increases image quality of the individual page to identify a page exception for any individual page for which the selected optional color does not increase image quality. The selected optional color is not used for individual pages that have a page exception.

Also, such methods automatically display, potentially in a queue on an interface of the printer, instructions to mount a selected replaceable printing module that corresponds to the selected optional color in the printer. Then, these methods print (using a printing engine of the printer) the print job using the selected replaceable printing module and the permanent color printing modules.

Various devices herein, such as printers, etc., include (among other components) a processor electrically connected to an interface, a printing engine, etc. The printing engine includes permanent color printing modules and at least one replaceable printing module, electrically connected to the processor. The permanent color printing modules are permanently mounted within the printer, and contain main colors (e.g., each contains a single one of the main colors). To the contrary, the replaceable printing modules are temporarily mounted within the printer, and contain optional colors (e.g., each contains a single one of the optional colors). The optional colors are more expensive and are used less frequently than the main colors during printing operations.

In printing operations, the processor receives a print job. The processor automatically analyzes the print job to determine what page locations can use the optional colors during printing. The page locations that can use the optional colors during printing comprise physical locations on media sheets where the optional colors would be printed during the printing. The processor automatically calculates different image quality increase values that would be produced by printing with different ones of the optional colors at the page locations. The different image quality increase values are determined by combining effects of the optional color with all of the main colors.

More specifically, the processor automatically calculates the different image quality increase values (for each optional color) by: determining a combined color error value (how much printing with a combination of the optional color and the main colors would deviate from a color standard); determining a main color error value (how much printing with the main colors alone would deviate from the color standard); subtracting the combined color error value from the main color error value to produce an error reduction for each of the optional colors; and determining different image quality increase values for each of the optional colors based on the (positive) quantity of error reduction of each of the optional colors. Also, the interface can receive user preferences for one or more of the optional colors. The processor calculates the highest print job image quality increase by weighting the optional colors preferred by the user higher than the optional colors not preferred by the user.

The processor automatically selects only one of the optional colors as a selected optional color to use in combination with all of the main colors for printing all of the page locations of the print job, based on which of the optional colors produces the highest print job image quality increase. The processor chooses the selected optional color by automatically evaluating each individual page of the print job to determine if use of the selected optional color increases image quality of that individual page. More specifically, the processor calculates the highest print job image quality increase by determining which optional color produces the highest image quality increase, relative to image quality increases of other ones of the optional colors, on: the most number of pages of the print job; the most number of page locations of the print job; or the greatest amount of printing area of the pages of the print job.

Further, the processor identifies a page exception for any individual page for which the selected optional color does not increase image quality. The selected optional color is not used for the individual page that has the page exception.

The interface automatically displays instructions (potentially in a queue) to mount a selected replaceable printing module corresponding to the selected optional color in the printer. The printing engine prints the print job using the selected replaceable printing module and the permanent color printing modules.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 5 is a chart showing image quality increases resulting from the use of optional colors.

DETAILED DESCRIPTION

As mentioned above, it is highly useful to have the capability to auto-program a job on extended gamut print engines to enable optimal image quality on spot colors. In view of this, the systems and methods herein provide "Auto Spot Programming." In one example, such Auto Spot Programming can be provided as a queue selection in a color management tab. Such a queue self-populates the color image quality settings.

When a job is submitted, the job is initially pre-flighted to determine the spot colors resident in the job. Thus, pre-flight is invoked before the job and page programming for spots is determined. The outcome of the pre-flight is a list of spot colors used in the PDL on a page-by-page basis.

Spot colors that are detected have their print accuracy determined using different available destination profiles. The destination profile covers different colorant combinations (e.g., CMYK vs. CMYK+Orange). For each spot color called out in the job, the potential accuracy for each colorant combination is determined. The potential accuracy for each spot call is determined via calls to the Spot Color Service with the available destination profiles. The service will return an accuracy number for each potential spot/colorant combination.

Based on the outcome yielding the highest accuracy across the job, the optional colorant job programming is determined. Then each page's overall accuracy is determined using the CMYK vs. CMYK+optional colorant. Thus, the spots are analyzed to determine the largest number of spots that will benefit from one of the potential optional colorants. Then, the pages are analyzed to determine if any of the page's spots will benefit from the optional colorant, and if not, a page exception is programmed for the use of CMYK only.

If the accuracy does not increase, CMYK alone is programmed on the page exception. If no spot colors are detected, the job programming falls back to the default CMYK output programming (e.g., the default CMYK destination profile is programmed on the job).

Therefore, the devices and methods herein enable optimal spot color processing and fifth colorant selection without user job programming. Additionally, the devices and methods herein are useful with one or more optional colorants, the optional colorant selected can be found by a comparison of the number of times or the number of pages on which the spot colors appear, and user preferences or locations where the spot colorants appear (e.g., cover pages) give more weight to certain spot colors.

Figure 1:
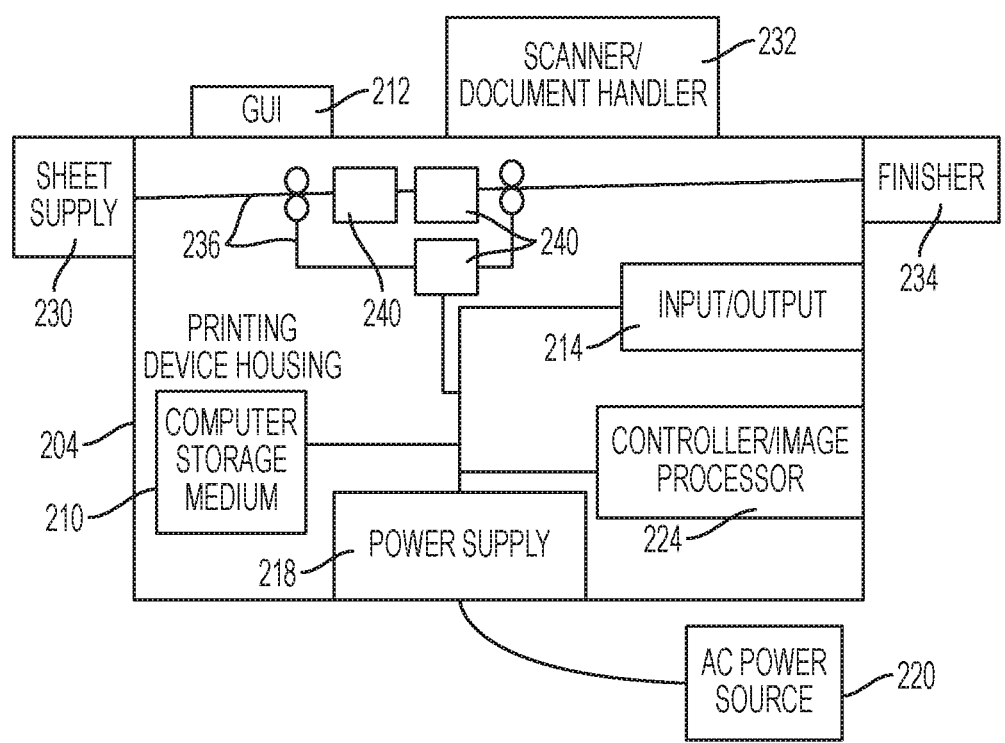
FIG. 1 is a schematic diagram illustrating printing devices herein.

FIG. 1 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

Figure 2:
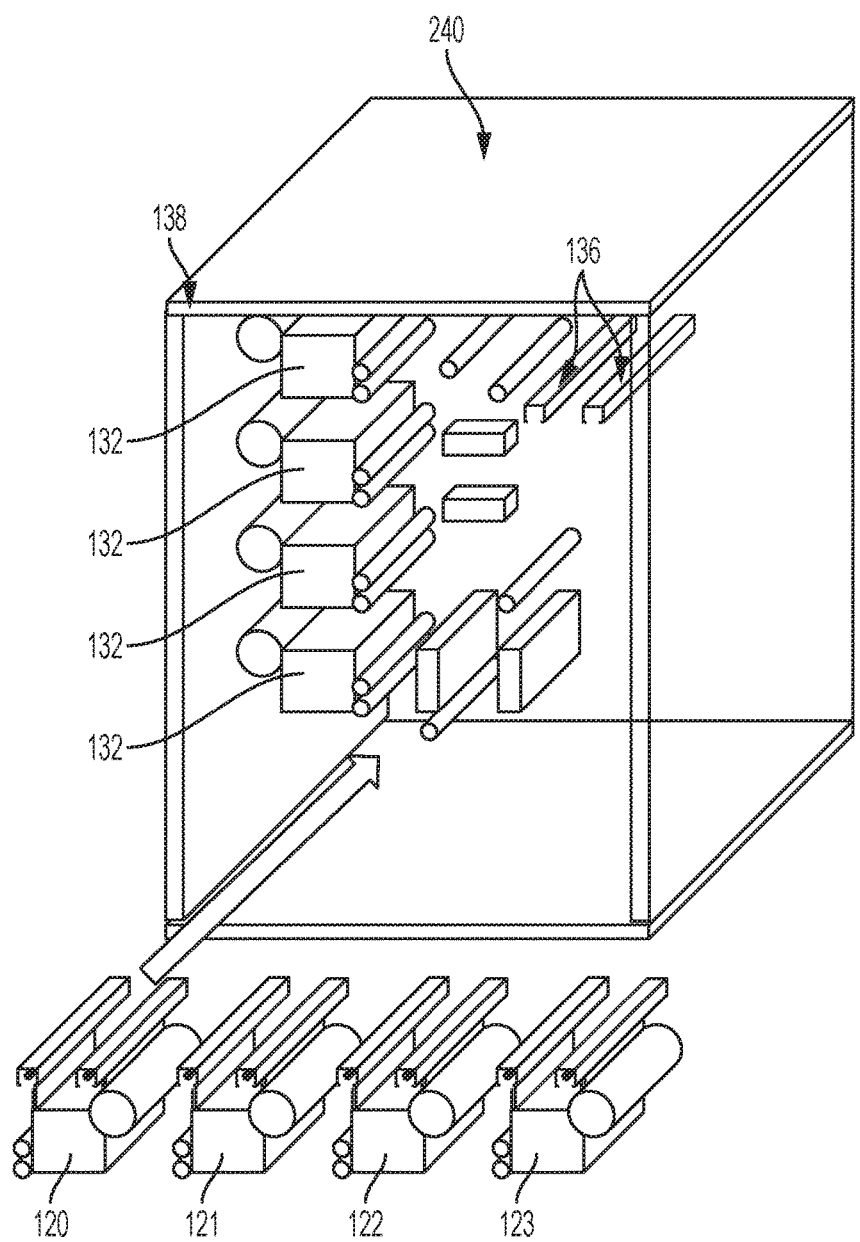
FIGS. 2 and 3 are schematic diagram illustrating the use of optional replacement printing modules with printing devices herein.

FIG. 2 illustrates a printing device or printing engine 240 (which is sometimes referred to as an image output terminal) having a frame 138. The printing device 240 includes various main (permanent) printing modules 132 that print using the printer's permanent colors. The main printing modules 132 are used for virtually all print jobs, and are not replaceable by printer users, and are only replaceable as part of a repair operation performed by repair professionals. Thus, the replaceable printing modules 120-123 are regularly switched to provide different colors during different printing operations, while the main printing modules 132 are only replaced when they are defective and the printer is being serviced for repair.

Figure 3:
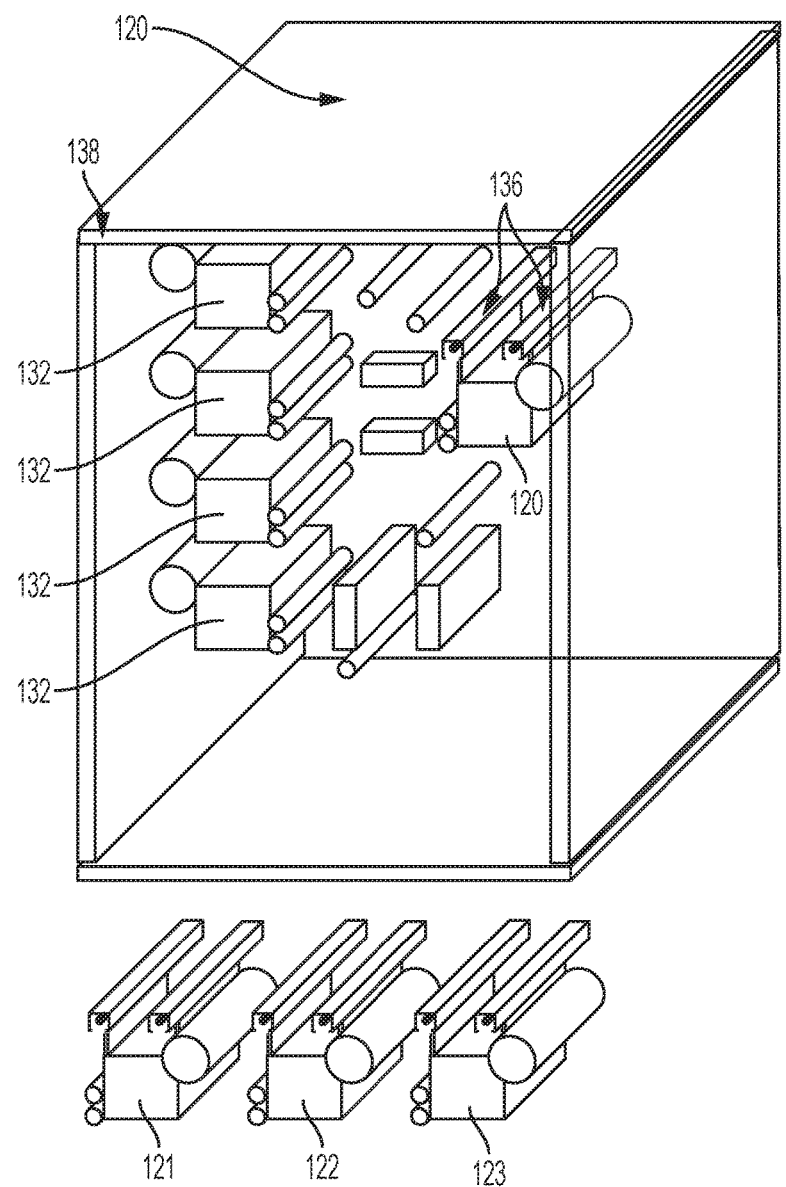

The replaceable printing modules 120-123 are sometimes positioned in a receptacle 136 of the printing device 240, and print using colors that only appear in a limited number of specialty print jobs. The receptacle 136 can include housing slots, that are similarly sized and shaped to match the size and shape of connections of the replaceable printing modules 120-123, allowing the slots to hold the replaceable printing modules. FIG. 3 illustrates one of the replaceable printing modules 120-123 mounted in the receptacle 136 (replaceable printing module 120 mounted in receptacle 136). In order to determine which replaceable printing modules 120-123 to insert into the receptacle 136, the processing shown in the flowchart in FIG. 4 is used.

Figure 4:
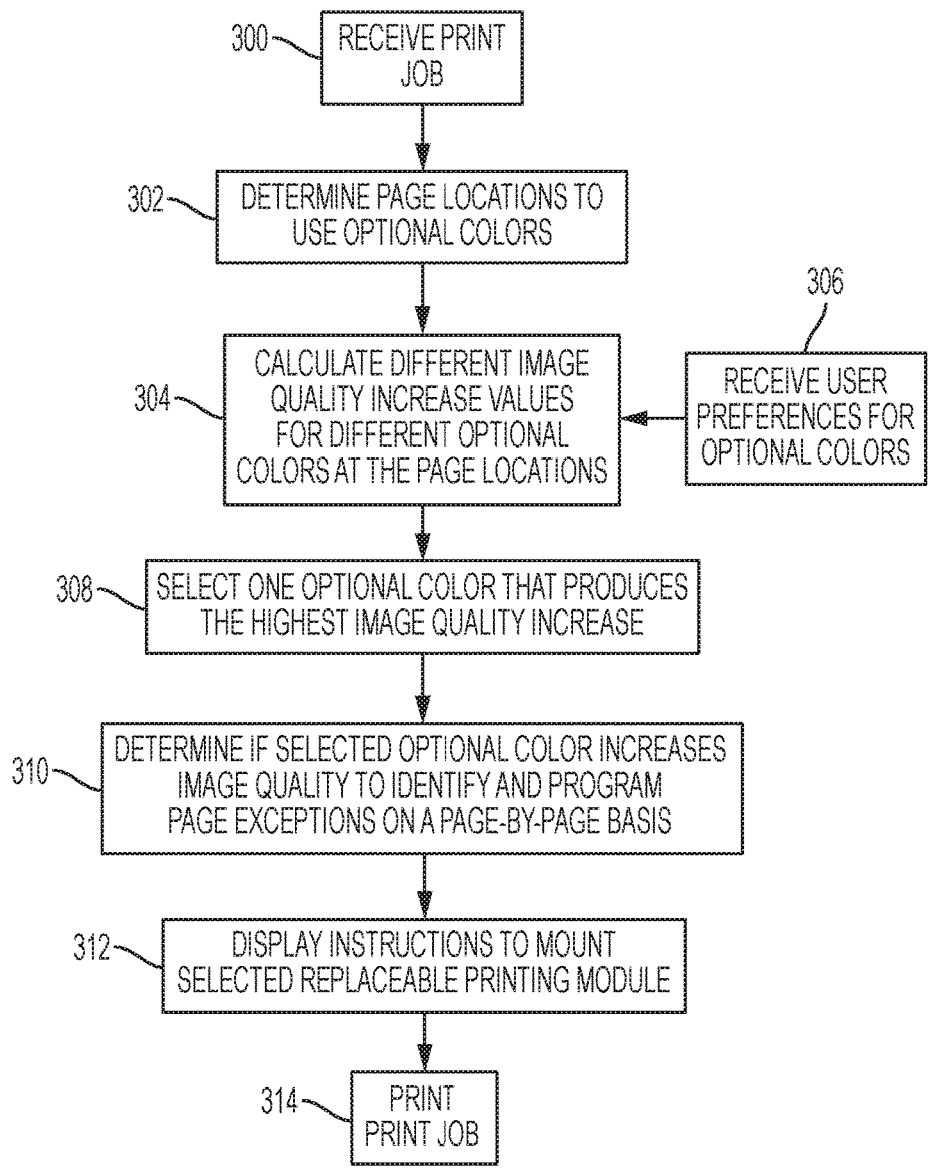
FIG. 4 is a flow diagram of various methods herein.

More specifically, as shown in FIG. 4, methods and devices herein receive a print job (item 300) into a printer having permanent color printing modules and replaceable printing modules. The permanent color printing modules are permanently mounted within the printer and contain main colors, and each of the permanent color printing modules contains a single main color. The replaceable printing modules are temporarily mounted within the printer and contain optional colors, and each the replaceable printing modules contains a single optional color. The optional colors are more expensive and are used less frequently than the main colors during printing operations.

As shown in item 302, such methods and devices automatically analyze the print job during pre-flight operations, using a processor of the printer, to determine what page locations can use the optional colors during printing (to determine the spot calls per page). The page locations that can use the optional colors during printing comprise physical locations on media sheets where the optional colors would be printed during the printing.

In item 304, these methods also automatically calculate, using the processor, different image quality increase values that would be produced by printing with different optional colors at the different page locations that would use the optional colors during printing. This process of calculating the different image quality increase values in item 304 determines the image quality increase values by combining the effects of the optional color with all of the main colors. Thus, the processing in item 304 determines the potential accuracy for each spot call, for different colorant destination profiles.

For example, in item 304, these image quality increase values can be calculated (for each different optional color at each different page location that would use an optional color during printing) by: determining a "combined color" error value (of how much printing with a combination of an optional color and the main colors would deviate from a color standard); determining a "main color" error value (of how much printing with the main colors alone would deviate from the color standard); subtracting the combined color error value from the main color error value, to produce an error reduction for each of the optional colors; and determining different image quality increase values (for each of the optional colors) based on the (positive) quantity of error reduction of each of the optional colors.

To illustrate the processing occurring in item 304, FIG. 5 provides a chart showing image quality increases resulting from the use of optional colors. As shown in FIG. 5, some pages of a print job will include multiple locations that use spot colors (e.g., pages 1, 4, and 5), others pages (page 2) will only have a single spot color (which may occur at many locations on page 2), and some pages (page 3) will not have any spot colors that could potentially use optional colors.

When performing the processing in item 304, each spot color on each page is evaluated for image quality increase. With respect to spot color A (e.g., Pantone® 101C) for example, the main color error value (e.g., 7) is found by determining how much printing with the main colors (e.g., CMYK) alone would deviate from the color standard of color A (e.g., Pantone® 101C). The process of determining the error value can utilize any error detection technique (automated or manual) that compares print colors (e.g., light spectrum representations of a color) against a known, theoretically perfect, color standard, such as the Pantone® system that provides a library of universally recognized spot colors.

Additionally, for spot color A on page 1, the combined color error value is found by determining how much printing with the main colors and one of the optional colors (e.g., CMYK+O) would deviate from the color standard of color A (e.g., Pantone® 101C). In FIG. 5 "O"; "G"; and "B" are variables representing any optional color, and could represent for example, orange, green and blue, or any other optional colors. Similarly, again for spot color A on page 1, the combined color error value is found by determining how much printing with the main colors and another one of the optional colors (e.g., CMYK+G or CMYK+B) would deviate from the color standard of color A (e.g., Pantone® 101C), also known as Delta-E (ΔE). As is understood by those ordinarily skilled in the art, Delta-E (ΔE) is a single number that represents the 'distance' between two colors. This Delta-E equation can be used to determine various factors such as how far off is a print or proof is from the original, how much has a device drifted and how effective is a particular profile for printing or proofing.

With these error calculations, it can be seen that CMYK+G has the lowest error, and therefore provides the highest image quality increase relative to CMYK alone. More specifically, CMYK+G reduces the error of CMYK alone by 4 (7−3=4), while CMYK+O does not reduce the error of CMYK alone (CMYK+O and CMYK both have an error of 7) and CMYK+B only reduces the error of CMYK alone by 1 (7−6=1); and therefore CMYK+G provides the highest image quality increase (an error reduction of 4) relative to CMYK alone. Therefore, for spot color A on page 1, item 304 in FIG. 4 determines that CMYK+G provides the highest image quality increase.

Similar processing occurs in item 304 for spot colors B (e.g., Pantone® 300) and C (e.g., Pantone® green). This results in a determination that CMYK+O provides the highest image quality increase for spot color B, and CMYK+G provides the highest image quality increase for spot color C. Similar processes are performed in item 304 to find the different error reductions achieved by using different optional colors for other spot colors or other pages of the single print job.

Also, in item 306, these methods and devices can receive user preferences for one or more of the optional colors. In such a case, the methods and devices herein can calculate an overall print job image quality increase by weighting the optional colors preferred by the user higher than the optional colors not preferred by the user. In one example of many different types of weighting processes, one could use a multiple less than 1.0 for preferred optional colors to cause them to yield less error, and/or use a multiple greater than 1.0 for non-preferred optional colors to cause them to yield more error, to alter the scoring of otherwise equally scoring optional colors. Thus, referring again to FIG. 5, if a user input a preference for optional color G, the error calculations shown in FIG. 5 would include a weighting factor that reduces the amount of error optional color G would produce, relative to unweighted or oppositely weighted error values. In addition, the processing in item 306 can weight optional colors that are used in more prominent, or more visible, areas (on cover sheets, within logos, at page corners, etc.) higher relative to other printing locations of the pages of the print job.

In item 308, the methods and devices herein automatically select, using the processor, only one of the optional colors (e.g., the "selected" optional color) to use in combination with all of the main colors for printing all of the single print job, based on which of the optional colors produces the highest print job image quality increase for all of the page locations of the print job. The highest print job image quality increase, for each optional color, can be calculated in item 308 in a number of different ways.

For example, the processing in item 308 can determine which optional color produces the highest image quality increase, relative to image quality increases of other ones of the optional colors: based on the most number of pages of the print job; based on the most number of page locations of the print job; or based on the greatest amount of printing area of the pages of the print job.

In the example shown in FIG. 5, in page 1, for spot colors A and C, it was determined that CMYK+G increased image quality the most for two of the three spot colors (for A and C, but not B). Because CMYK+G increased image quality for the most (two of three) of the spot colors on page 1, it is selected as the best optional color for that page. However, other methodologies could be used to select the best optional color for each page within the print job, including area coverage, magnitude of image quality increase, etc.

For example, for page 4, CMYK+G increased image quality the most for spot colors D, but CMYK+B increased image quality the most for spot colors B; preventing one colorant from being used for "the most" of the spot colors on page 4. However, secondary selection criteria can be used, such as the magnitude of the image quality increase when there is not a color that increases image quality for a majority of the spots. Thus, for page 4, CMYK+G produced a magnitude error reduction of 3 (4−1=3); while CMYK+B only produced a magnitude error reduction of 1 (3−2=1). In this situation, the methods and devices herein automatically select CMYK+G as the optional color that increases quality the most for page 4 because, while both CMYK+G and CMYK+B both produced image quality increases, CMYK+G produced a greater magnitude error reduction relative to CMYK+B.

In a similar manner, the methods and devices herein automatically select CMYK+O as the optional color that increases quality the most for page 5 because, while CMYK+O, CMYK+G, and CMYK+B all produced image quality increases, CMYK+O produced a greater magnitude error reduction relative to CMYK+G, and CMYK+B. More specifically, for spot color A on page 5, CMYK+O produced an error reduction of 3 relative to CMYK alone (5−2=3); and for spot color E on page 5, CMYK+O produced an error reduction of 3 relative to CMYK alone (7−4=3); resulting in a cumulative error reduction of 6 (3+3=6) for CMYK+O on page 5. To the contrary, for spot color E on page 5, CMYK+G produced an error reduction of 4 relative to CMYK alone (7−3=4); but did not produce error reduction for spot color A or F; resulting in a cumulative error reduction of 4 on page 5. Also for spot color A on page 5, CMYK+B produced an error reduction of 1 relative to CMYK alone (5−4=1); but did not produce error reduction for spot color E or F; resulting in a cumulative error reduction of 1 on page 5. Thus, CMYK+O is the optional color that increases quality the most for page 5 because, while CMYK+O, CMYK+G, and CMYK+B all produced image quality increases, CMYK+O produced a greater magnitude cumulative error reduction (6) relative to CMYK+G (4), and CMYK+B (1).

In addition, CMYK+G increased image quality the most for pages 1 and 4, while the next closest optional colorant (CMYK+O) only increased the image quality for one page (page 5). Note that none of the optional colors increased image quality for page 2, and page 3 did not call for any spot colors, and therefore there was not an optional color that produced the most error reduction for pages 2 and 3.

After choosing the selected optional color in item 308, and before performing any printing (item 314 below), in item 310 such methods and devices automatically evaluate each individual page of the print job, using the processor, to determine if use of the selected optional color increases image quality of the individual page to identify and program a page exception for any individual page for which the selected optional color does not increase image quality on a page-by-page basis. In the example shown in FIG. 5, the methods and devices herein automatically identify and program pages 2 and 3 as having a spot color exception because none of the optional colors increased image quality for page 2, and page 3 did not call for any spot colors. The selected optional color is not used for individual pages (2 and 3) that have a programmed page exception.

Figure 6:
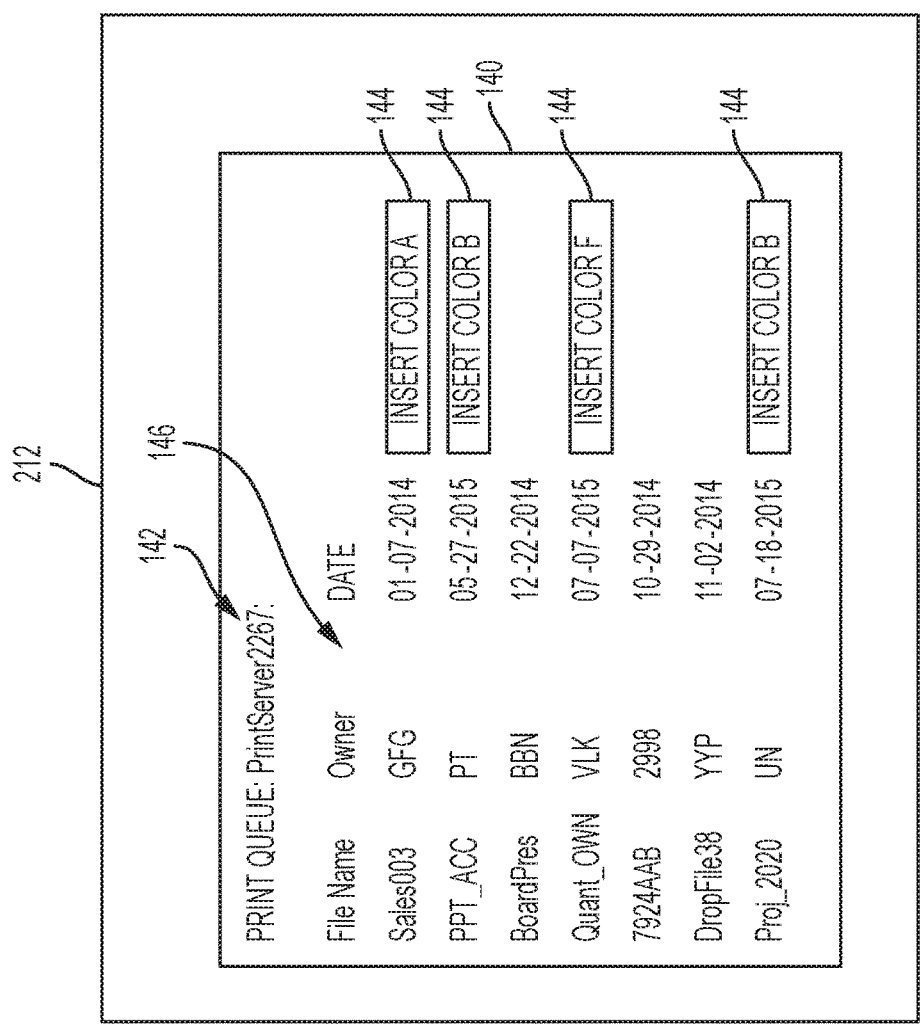
FIG. 6 is a user interface screenshot illustrating a display provided to the user.

Also, in item 312, such methods automatically display, potentially in a queue on an interface of the printer, instructions to mount a selected replaceable printing module (120-123, in FIGS. 2 and 3) that corresponds to the selected optional color in the receptacle 136 of the printer. For example, as shown in FIG. 6, a screenshot for a print queue 140 displayed on the user interface 212 could identify a specific print server 142, and details 146 about jobs in the queue 140 (e.g., print job name, owner, date, etc). Items 144 illustrate messages to the user to insert the appropriate color replaceable printing modules (120-123) in the receptacle 136, as automatically selected by methods and devices herein, as described above.

After such processing, in item 314, the print job is rasterized and printed using the printing engine 240. In other alternatives that base the selection of the appropriate optional color on the printing area of various spot colors, the rasterization process can be performed earlier.

Thus, as shown in FIGS. 1-3, and 6 various devices herein, such as printers 204, printing engine 240, etc., include (among other components) a processor 224 electrically connected to an interface 212, a printing engine 240, etc. The printing engine 240 includes permanent color printing modules 132 and at least one replaceable printing module, electrically connected to the processor 224. The permanent color printing modules 132 are permanently mounted within the printer, and contain main colors (e.g., each contains a single one of the main colors). To the contrary, the replaceable printing modules are temporarily mounted within the printer, and contain optional colors (e.g., each contains a single one of the optional colors). The optional colors are more expensive and are used less frequently than the main colors during printing operations.

In printing operations, the processor 224 receives a print job. The processor 224 automatically analyzes the print job to determine what page locations can use the optional colors during printing. The page locations that can use the optional colors during printing comprise physical locations on media sheets where the optional colors would be printed during the printing. The processor 224 automatically calculates different image quality increase values that would be produced by printing with different ones of the optional colors at the page locations. The different image quality increase values are determined by combining effects of the optional color with all of the main colors.

More specifically, the processor 224 automatically calculates the different image quality increase values (for each optional color) by: determining a combined color error value (how much printing with a combination of the optional color and the main colors would deviate from a color standard); determining a main color error value (how much printing with the main colors alone would deviate from the color standard); subtracting the combined color error value from the main color error value to produce an error reduction for each of the optional colors; and determining different image quality increase values for each of the optional colors based on the (positive) quantity of error reduction of each of the optional colors. Also, the interface 212 can receive user preferences for one or more of the optional colors. The processor 224 calculates the highest print job image quality increase by weighting the optional colors preferred by the user higher than the optional colors not preferred by the user.

The processor 224 automatically selects only one of the optional colors as a selected optional color to use in combination with all of the main colors for printing all of the page locations of the print job, based on which of the optional colors produces the highest print job image quality increase. The processor 224 chooses the selected optional color by automatically evaluating each individual page of the print job to determine if use of the selected optional color increases image quality of that individual page. More specifically, the processor 224 calculates the highest print job image quality increase by determining which optional color produces the highest image quality increase, relative to image quality increases of other ones of the optional colors, on: the most number of pages of the print job; the most number of page locations of the print job; or the greatest amount of printing area of the pages of the print job.

Further, the processor 224 identifies a page exception for any individual page for which the selected optional color does not increase image quality. The selected optional color is not used for the individual page that has the page exception.

The interface 212 automatically displays instructions (potentially in a queue) to mount a selected replaceable printing module corresponding to the selected optional color in the printer. The printing engine 240 prints the print job using the selected replaceable printing module and the permanent color printing modules 132.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially with the image information data being processed, and the speed at which such data is processed). Specifically, processes such as receiving electronic image streams, evaluating spectral image quality, determining if error is reduced, etc., requires the utilization of different specialized machines, and humans performing such processing would not produce useful results because of the time lag, inconsistency, and inaccuracy humans would introduce into the results.

Further, such machine-only processes are not mere "post-solution activity" because the image quality analysis is used with a physical printer that is printing print jobs on sheets of media. Similarly, the electronic transmissions of the print jobs utilize special-purpose equipment (printing equipment, print servers, print job routers, etc.) that are distinct from a general-purpose processor. Also, the printing is integral with the process performed by the methods herein, and is not mere post-solution activity, because the print job is executed (potentially with an optional color) to perform printing operations with printing machines. In other words, these various machines are integral with the methods herein because the methods cannot be performed without the machines (and cannot be performed by humans alone).

Additionally, the methods herein solve many highly complex technological problems. For example, as mentioned above, image quality issues occur when printing with optional print colors, and users spend large amounts of time programming print jobs in inefficient (and sometimes incorrect) ways. Methods herein solve this technological problem by avoiding the need for users to program the optional color use with print jobs. This reduces the amount of electronic storage that a printer must maintain by not having print job programming resources, and also reduces the technological complexity by not needing to have users program print jobs for the use of optional colors. By granting such benefits to providers, the methods herein reduce the amount and complexity of hardware and software needed to be purchased, installed, and maintained by print professionals, thereby solving a substantial technological problem that is experienced today.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printer comprising:
a processor;
an interface electrically connected to said processor; and
a printing engine electrically connected to said processor, said printing engine comprising:
permanent color printing modules electrically connected to said processor; and
replaceable printing modules electrically connected to said processor,
said permanent color printing modules contain main colors,
said replaceable printing modules contain optional colors,
said processor receives a print job,
said processor automatically analyzes said print job to determine what page locations can use said optional colors during printing,
said processor automatically calculates different image quality increase values that would be produced by printing with different ones of said optional colors at said page locations,
said processor automatically selects only one of said optional colors as a selected optional color to use in combination with all of said main colors for printing all of said print job, based on which of said optional colors produces the highest print job image quality increase,
said processor identifies a page exception for any individual page of said print job for which said selected optional color does not increase image quality,
said selected optional color is not used for said individual page that has said page exception,
said interface automatically displays instructions to mount a selected replaceable printing module corresponding to said selected optional color in said printer, and
said printing engine prints said print job using said selected replaceable printing module and said permanent color printing modules.

2. The printer according to claim 1, said processor automatically calculates said different image quality increase values, for each of said optional colors by:
determining a combined color error value of how much printing with a combination of said optional color and said main colors would deviate from a color standard;
determining a main color error value of how much printing with said main colors alone would deviate from said color standard;
subtracting said combined color error value from said main color error value to produce an error reduction for each of said optional colors; and
determining said different image quality increase values for each of said optional colors based on a positive quantity of said error reduction of each of said optional colors.

3. The printer according to claim 1, said processor calculates said highest print job image quality increase by determining which said optional color produces the highest image quality increase, relative to image quality increases of other ones of said optional colors, on:
the most number of pages of said print job;
the most number of page locations of said print job; or
the greatest amount of printing area of said pages of said print job.

4. The printer according to claim 3, said interface receives user preferences for ones of said optional colors, said processor calculates said highest print job image quality increase by weighting said optional colors preferred by said user higher than said optional colors not preferred by said user.

5. The printer according to claim 1, said displaying comprising providing said instructions to mount a selected replaceable printing module in a queue on said interface.

6. The printer according to claim 1, said processor automatically calculates said different image quality increase values by combining effects of said optional color with all of said main colors.

7. The printer according to claim 1, said page locations that can use said optional colors during printing comprise physical locations on media sheets where said optional colors would be printed during said printing.

8. A printer comprising:
a processor;
an interface electrically connected to said processor; and
a printing engine electrically connected to said processor, said printing engine comprising:
permanent color printing modules electrically connected to said processor; and
replaceable printing modules electrically connected to said processor,
said permanent color printing modules are permanently mounted within said printer,
said permanent color printing modules contain main colors,
each of said permanent color printing modules contains a single one of said main colors,
said replaceable printing modules are temporarily mounted within said printer,
said replaceable printing modules contain optional colors,
each said replaceable printing modules contains a single one of said optional colors,
said optional colors are more expensive and are used less frequently than said main colors during printing operations,
said processor receives a print job, said processor automatically analyzes said print job to determine what page locations can use said optional colors during printing, said processor automatically calculates different image quality increase values that would be produced by printing with different ones of said optional colors at said page locations, said processor automatically selects only one of said optional colors as a selected optional color to use in combination with all of said main colors for printing all of said print job, based on which of said optional colors produces the highest print job image quality increase, said processor selects said selected optional color by automatically evaluating each individual page of said print job to determine if use of said selected optional color increases image quality of said individual page, said processor identifies a page exception for any said individual page for which said selected optional color does not increase image quality, said selected optional color is not used for said individual page that has said page exception, said interface automatically displays instructions to mount a selected replaceable printing module corresponding to said selected optional color in said printer, and said printing engine prints said print job using said selected replaceable printing module and said permanent color printing modules.

9. The printer according to claim 8, said processor automatically calculates said different image quality increase values, for each of said optional colors by:
determining a combined color error value of how much printing with a combination of said optional color and said main colors would deviate from a color standard;
determining a main color error value of how much printing with said main colors alone would deviate from said color standard;
subtracting said combined color error value from said main color error value to produce an error reduction for each of said optional colors; and
determining said different image quality increase values for each of said optional colors based on a positive quantity of said error reduction of each of said optional colors.

10. The printer according to claim 8, said processor calculates said highest print job image quality increase by determining which said optional color produces the highest image quality increase, relative to image quality increases of other ones of said optional colors, on:
the most number of pages of said print job;
the most number of page locations of said print job; or
the greatest amount of printing area of said pages of said print job.

11. The printer according to claim 10, said interface receives user preferences for ones of said optional colors, said processor calculates said highest print job image quality increase by weighting said optional colors preferred by said user higher than said optional colors not preferred by said user.

12. The printer according to claim 8, said displaying comprising providing said instructions to mount a selected replaceable printing module in a queue on said interface.

13. The printer according to claim 8, said processor automatically calculates said different image quality increase values by combining effects of said optional color with all of said main colors.

14. The printer according to claim 8, said page locations that can use said optional colors during printing comprise physical locations on media sheets where said optional colors would be printed during said printing.

15. A method comprising:
receiving a print job into a printer having permanent color printing modules and replaceable printing modules, said permanent color printing modules are permanently mounted within said printer, said permanent color printing modules contain main colors, each of said permanent color printing modules contains a single one of said main colors, said replaceable printing modules are temporarily mounted within said printer, said replaceable printing modules contain optional colors, each said replaceable printing modules contains a single one of said optional colors, and said optional colors are more expensive and are used less frequently than said main colors during printing operations;
automatically analyzing said print job, using a processor of said printer, to determine what page locations can use said optional colors during printing;
automatically calculating, using said processor, different image quality increase values that would be produced by printing with different ones of said optional colors at said page locations;
automatically selecting, using said processor, only one of said optional colors as a selected optional color to use in combination with all of said main colors for printing all of said print job, based on which of said optional colors produces the highest print job image quality increase;
after said selecting said selected optional color, automatically evaluating each individual page of said print job, using said processor, to determine if use of said selected optional color increases image quality of said individual page;
identifying a page exception for any said individual page for which said selected optional color does not increase image quality, said selected optional color is not used for said individual page that has said page exception;
automatically displaying, on an interface of said printer, instructions to mount a selected replaceable printing module corresponding to said selected optional color in said printer; and
printing, by a printing engine of said printer, said print job using said selected replaceable printing module and said permanent color printing modules.

16. The method according to claim 15, said automatically calculating different image quality increase values comprises, for each of said optional colors:
determining a combined color error value of how much printing with a combination of said optional color and said main colors would deviate from a color standard;
determining a main color error value of how much printing with said main colors alone would deviate from said color standard;
subtracting said combined color error value from said main color error value to produce an error reduction for each of said optional colors; and
determining said different image quality increase values for each of said optional colors based on a positive quantity of said error reduction of each of said optional colors.

17. The method according to claim 15, further comprising calculating said highest print job image quality increase by determining which said optional color produces the highest image quality increase, relative to image quality increases of other ones of said optional colors, on:
- the most number of pages of said print job;
- the most number of page locations of said print job; or
- the greatest amount of printing area of said pages of said print job.

18. The method according to claim 17, further comprising receiving user preferences for ones of said optional colors, said calculating said highest print job image quality increase weights said optional colors preferred by said user higher than said optional colors not preferred by said user.

19. The method according to claim 15, said displaying comprising providing said instructions to mount a selected replaceable printing module in a queue on said interface.

20. The method according to claim 15, said calculating said different image quality increase values determines said image quality increase values by combining effects of said optional color with all of said main colors.

* * * * *